United States Patent
Voelkel

(10) Patent No.: US 12,378,998 B2
(45) Date of Patent: Aug. 5, 2025

(54) BEARING ASSEMBLY FOR INTEGRATING INTO AN ELECTRIC DRIVE ASSEMBLY FOR A VEHICLE, AND ELECTRIC DRIVE ASSEMBLY COMPRISING THE BEARING ASSEMBLY

(71) Applicant: Schaeffler Technologies AG & Co. KG, Herzogenaurach (DE)

(72) Inventor: Franz Voelkel, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 233 days.

(21) Appl. No.: 17/799,030

(22) PCT Filed: Feb. 18, 2021

(86) PCT No.: PCT/DE2021/100164
§ 371 (c)(1),
(2) Date: Aug. 11, 2022

(87) PCT Pub. No.: WO2021/180268
PCT Pub. Date: Sep. 16, 2021

(65) Prior Publication Data
US 2023/0064643 A1    Mar. 2, 2023

(30) Foreign Application Priority Data
Mar. 10, 2020  (DE) .................... 10 2020 106 461.6

(51) Int. Cl.
*F16C 35/07*  (2006.01)
*F16C 19/06*  (2006.01)
(Continued)

(52) U.S. Cl.
CPC ............ *F16C 35/077* (2013.01); *F16C 19/06* (2013.01); *F16C 19/52* (2013.01); *F16C 23/08* (2013.01);
(Continued)

(58) Field of Classification Search
CPC ........ F16C 19/06; F16C 19/52; F16C 19/525; F16C 23/08; F16C 27/04; F16C 27/066;
(Continued)

(56) References Cited

U.S. PATENT DOCUMENTS

| 5,059,041 A | 10/1991 | Watanabe et al. |
| 5,961,222 A | 10/1999 | Yabe et al. |

(Continued)

FOREIGN PATENT DOCUMENTS

| CN | 103089829 A | 5/2013 |
| CN | 108167323 A | 6/2018 |

(Continued)

OTHER PUBLICATIONS

Machine Translation of JP 2000310296 (Year: 2000).*
(Continued)

*Primary Examiner* — Alan B Waits
(74) *Attorney, Agent, or Firm* — Matthew V. Evans

(57) ABSTRACT

A bearing assembly of an electric drive assembly for a vehicle includes an insulating device having a sleeve with an electrically insulating coating, and a bearing device disposed in the sleeve. In an example embodiment, the sleeve has an inner peripheral surface and an outer peripheral surface, and the outer peripheral surface is formed by the electrically insulating coating. In an example embodiment, the sleeve is formed from steel, and the electrically insulating coating is formed from a plastic material having an electrically insulating property. In an example embodiment, the sleeve is designed as a cylinder having an end face with an outer side, and the electrically insulating coating is disposed on the outer side. In an example embodiment, the bearing device is a floating bearing axially movable relative to the sleeve.

20 Claims, 2 Drawing Sheets

(51) Int. Cl.
*F16C 19/52* (2006.01)
*F16C 23/08* (2006.01)
*F16C 27/04* (2006.01)
*F16C 27/06* (2006.01)
*F16C 35/077* (2006.01)
*H02K 7/08* (2006.01)
*H02K 11/00* (2016.01)

(52) U.S. Cl.
CPC ............ *F16C 27/04* (2013.01); *F16C 27/066* (2013.01); *H02K 7/083* (2013.01); *H02K 11/0094* (2013.01); *F16C 2202/30* (2013.01)

(58) Field of Classification Search
CPC ...... F16C 35/07; F16C 35/073; F16C 35/077; F16C 2202/30; H02K 5/173; H02K 7/083; H02K 11/0094
See application file for complete search history.

(56) References Cited

U.S. PATENT DOCUMENTS

| | | | | |
|---|---|---|---|---|
| 6,030,128 A | * | 2/2000 | Pontzer | ................ H02K 5/1732 384/536 |
| 2008/0012440 A1 | | 1/2008 | Zhong et al. | |
| 2019/0186535 A1 | * | 6/2019 | Forster | .................... F16C 19/16 |

FOREIGN PATENT DOCUMENTS

| | | | | |
|---|---|---|---|---|
| DE | 202004013642 U1 | * | 12/2004 | ............ F16C 35/077 |
| DE | 102010024582 A1 | | 12/2011 | |
| DE | 102012218522 A1 | | 4/2014 | |
| DE | 102012220985 B3 | | 5/2014 | |
| DE | 102013225341 A1 | * | 6/2015 | ............ F16C 35/073 |
| DE | 102017222792 A1 | * | 6/2019 | ............ F16C 19/16 |
| DE | 102020106339 A1 | | 9/2021 | |
| EP | 1455434 A1 | | 9/2004 | |
| EP | 2400174 A2 | * | 12/2011 | ............ F16C 19/527 |
| JP | 2000310296 A | * | 11/2000 | ............ H02K 11/40 |
| JP | 2004221211 A | | 8/2004 | |
| JP | 2008082415 A | * | 4/2008 | ............ F16C 35/077 |
| JP | 2012255564 A | | 12/2012 | |
| WO | 0209258 A1 | | 1/2002 | |

OTHER PUBLICATIONS

Machine Translation of JP 2008082415 (Year: 2008).*
Machine Translation of EP 2400174 (Year: 2011).*
Machine Translation of DE 102013225341 (Year: 2015).*
Machine Translation of DE102017222792A1 (Year: 2019).*
Machine Translation of DE202004013642U1 (Year: 2004).*

* cited by examiner

BEARING ASSEMBLY FOR INTEGRATING INTO AN ELECTRIC DRIVE ASSEMBLY FOR A VEHICLE, AND ELECTRIC DRIVE ASSEMBLY COMPRISING THE BEARING ASSEMBLY

CROSS-REFERENCE TO RELATED APPLICATIONS

This application is the United States National Phase of PCT Appln. No. PCT/DE2021/100164 filed Feb. 18, 2021, which claims priority to German Application No. DE102020106461.6 filed Mar. 10, 2020, the entire disclosures of which are incorporated by reference herein.

TECHNICAL FIELD

The present disclosure relates to a bearing assembly for integrating into an electric drive assembly for a vehicle. The disclosure further relates to an electric drive assembly with the bearing assembly.

BACKGROUND

In drive modules for vehicles, electric drives are used to generate the drive torque. Undesirable electric currents are generated in the electric drive due to very strong voltage edges in the voltage supply to the electric drive. The electrical currents also flow through the rotor bearings, which are damaged by mechanical wear and also by the passage of a current.

The insulation of rotor bearings, which are integrated in the electric drive to support a rotor shaft, is already known from the prior art. Such insulators can be attached to an outer peripheral surface of an outer ring of the rotor bearing and be intended to insulate the rotor bearing from the electrical currents in order to protect it from increased wear due to the passage of a current. For example, the publication DE 690 16 321 T2 describes an electrically insulated bearing with an outer ring designed as a one-piece body, which is provided on its peripheral surface with an insulating polymer material having an electrically insulating property. A thin metal plate is provided on an outer surface of the insulating polymer material.

SUMMARY

A bearing assembly is proposed which is designed to be integrated into an electric drive assembly for a vehicle. The bearing assembly has a bearing device. The bearing device may be designed as a rolling bearing. The rolling bearing includes an outer ring, multiple rolling elements and an inner ring. The rolling elements may be rotatably received between the outer ring and the inner ring. For example, the rolling bearing can be a ball bearing or a roller bearing. In an example embodiment, the rolling bearing is formed from steel.

The bearing assembly includes an insulating device. The insulating device is designed to electrically insulate the rolling bearing. For example, the insulating device is designed to insulate the rolling bearing from electrical currents flowing in the electric drive assembly.

The insulating device is designed as a sleeve. The sleeve may be designed as a cylinder and/or may be cylindrical in shape. The cylinder may have an end face. In an example embodiment, the sleeve as a cylinder includes a cylinder jacket, which is partially closed by the end face. For example, the end face is designed to be annular in shape so that the end face has a central opening.

The rolling bearing is received in the sleeve at least partially, e.g., entirely. The rolling bearing may be surrounded by the cylinder jacket and the end face in sections, e.g., for the most part. In an example embodiment, the outer ring of the rolling bearing is surrounded by the cylinder jacket and by the end face.

According to the disclosure, the sleeve has an electrically insulating coating. The rolling bearing may be electrically insulated against the passage of a current by the electrically insulating coating in the sleeve. For example, the electrically insulating coating is formed from a plastic material, wherein the plastic material has electrically insulating properties. It is not necessary to provide the rolling bearing itself with an insulating coating or other insulating device.

In an example embodiment, the sleeve, e.g., the cylinder jacket, has an inner peripheral surface and an outer peripheral surface. The outer peripheral surface may have the electrically insulating coating. In an example embodiment, the electrically insulating coating is applied to the outer peripheral surface. Specifically, the electrically insulating coating completely covers the outer peripheral surface. Optionally, the electrically insulating coating is materially bonded to the outer peripheral surface. It is possible that the insulating coating forms the outer peripheral surface.

Optionally, in addition, the end face of the cylinder jacket has the electrically insulating coating. In an example embodiment, the electrically insulating coating is materially bonded to the end face. The electrically insulating coating may completely cover the end face. The electrically insulating coating may be arranged on the outer side of the end face. In an example embodiment, the electrically insulating coating forms the outer side of the end face.

The electrically insulating coating may extend without interruptions over the outer peripheral surface of the cylinder jacket and over the outer side of the visible side, completely covering and/or forming it. In an example embodiment, the outer peripheral surface and the outer side are overmolded with the electrically insulating coating as the plastic material.

In an example embodiment, the insulating device designed as a sleeve is formed from steel. In an example embodiment, it is a steel sleeve covered with the electrically insulating coating, e.g., from the plastic material, on the outer peripheral surface of the cylinder jacket and optionally, in addition, on the outer side of the end face.

The rolling bearing may be designed as a floating bearing. In an example embodiment, the floating bearing allows axial movement of the rolling bearing relative to the sleeve. The rolling bearing may be axially movable relative to the sleeve. In an example embodiment, an outer peripheral surface of the outer ring can slide along the inner peripheral surface of the sleeve in the axial direction. The axial movement of the rolling bearing relative to the sleeve can compensate for a thermal linear expansion of a shaft of the electric drive assembly, which can be mounted in the rolling bearing.

The outer ring of the rolling bearing, which is formed from steel, for example, is moved against the inner peripheral surface of the sleeve, which is formed from steel, for example, during the axial movement, and thus wear of the two components during the axial movement of the rolling bearing can be kept a low degree. Since the electrically insulating coating is arranged on the outer peripheral surface of the insulating device designed as a sleeve, it is independent of the axial movement of the rolling bearing, which is performed along the inner peripheral surface of the sleeve. In an example embodiment, wear of the electrically insulating coating due to the axial movement of the rolling bearing can be prevented, thereby increasing the service life of the rolling bearing.

In a further possible embodiment, the sleeve has an end stop for the axially movable rolling bearing as a floating bearing. For example, the end stop is formed by the end face. A spring device may be arranged between the end stop and the rolling bearing, e.g., between the end stop and the outer ring of the rolling bearing. In an example embodiment, the spring device is designed to elastically arrange the rolling bearing, especially the outer ring, relative to the stop.

An electric drive assembly for a vehicle is also disclosed. The vehicle may be designed as a passenger car, bus, or truck. In alternative embodiments, the vehicle can also be a bicycle, motorcycle, e-scooter, and/or a single-track or dual-track and/or single-axle or dual-axle vehicle. The vehicle is designed as an electric vehicle, e.g., as a purely electric vehicle or as a hybrid vehicle.

The electric drive assembly has an electric drive section. An electric drive, e.g., an electric motor, which can also be referred to as an electric machine, is arranged in the electric drive section. The electric motor may be designed as an electric motor controlled by a frequency converter, e.g., as an asynchronous electric motor. The electric motor can be designed as a wet-running electric motor or as a dry-running electric motor.

The electric drive as the electric motor may define a main axis. The electric drive has a rotor and optionally, a stator. The stator and the rotor may be arranged to be concentric and/or coaxial with one another and/or with the main axis.

Furthermore, the electric drive section has a shaft, and the shaft is connected to the rotor, e.g., in gearing terms. In an example embodiment, the shaft is driven via and/or by the rotor.

The shaft may be designed as a rotor shaft. In an example embodiment, with an embodiment as a rotor shaft, it can be connected to the rotor in a non-rotatable, rigid and/or integral manner. Furthermore, the rotor shaft may be electrically connected to the rotor. This means that if there is a potential difference between the rotor and a surrounding structure, the same potential difference will exist between the rotor shaft and the surrounding structure.

The electric drive assembly has a transmission section, and a transmission device is arranged in the transmission section. The transmission device can be designed as a clutch device and/or as a shift device and/or as a transmission device. The shaft is connected to the transmission device in gearing terms. In an example embodiment, the shaft forms an input shaft into the transmission device.

The shaft has a shaft section. The shaft section may be arranged on the drive side. In an example embodiment, the shaft section faces away from the transmission section.

The electric drive assembly includes a housing section. The housing section may be part of a housing that at least partially, e.g., mostly or completely, surrounds the electric drive section and the transmission section. In an example embodiment, the housing section is arranged in the electric drive section and/or associated with the electric drive. The housing section may receive the electric drive. The shaft section of the shaft is rotatably mounted relative to the housing section.

According to the disclosure, the electric drive assembly includes the bearing assembly according to the previous description.

In an example embodiment, the shaft section of the shaft is rotatably mounted relative to the housing section in the rolling bearing of the bearing assembly. The inner ring of the rolling bearing may be seated on the shaft section. In an example embodiment, the inner ring is connected in a non-rotatable manner to the shaft section so that it rotates with the shaft section.

One possible constructive embodiment of the invention provides that the housing section has a receiving region for the bearing assembly. The receiving region can be integrated into the housing section, e.g., it can be formed in the housing section in the shape of a cylinder or a bushing.

The bearing assembly may include a bushing arranged in the receiving region. Alternatively or optionally, the receiving region is formed by the bushing. For example, the bushing can be formed from steel, aluminum or a plastic material. In an example embodiment, the bushing is firmly connected to and/or integrated into the housing section. The bushing can, for example, be molded into the receiving region in a materially bonding manner or fastened in the receiving region in a form-fitting and/or force-fitting manner.

In an example embodiment, the sleeve designed as an insulating device is received in the receiving region and/or in the bushing in a non-rotatable manner. Optionally, the sleeve is connected to a peripheral surface of the receiving region and/or to an inner peripheral surface of the bushing in a force-fitting and/or friction-locking manner. The sleeve with the electrically insulating coating may abut the peripheral surface of the receiving region and/or the inner peripheral surface of the bushing.

The rolling bearing may be received in the sleeve in an axially movable manner. In this way, the rolling bearing can be insulated from the electrical currents in the electric drive assembly, which flow, for example, through the housing section. A passage of a current between the shaft section and the housing section can also be interrupted, since the rolling bearing cannot form an electrical connection to the housing section due to the insulation provided by the sleeve as an insulating device. Axial movement of the rolling bearing in the sleeve and thus relative to the housing section is possible without damaging the electrically insulating coating of the insulating device.

BRIEF DESCRIPTION OF THE DRAWINGS

An example embodiment is described in more detail below with reference to the attached drawings. In the figures.

DETAILED DESCRIPTION

Corresponding or identical components are each provided with the same reference symbols in the figures.

Figure 1:
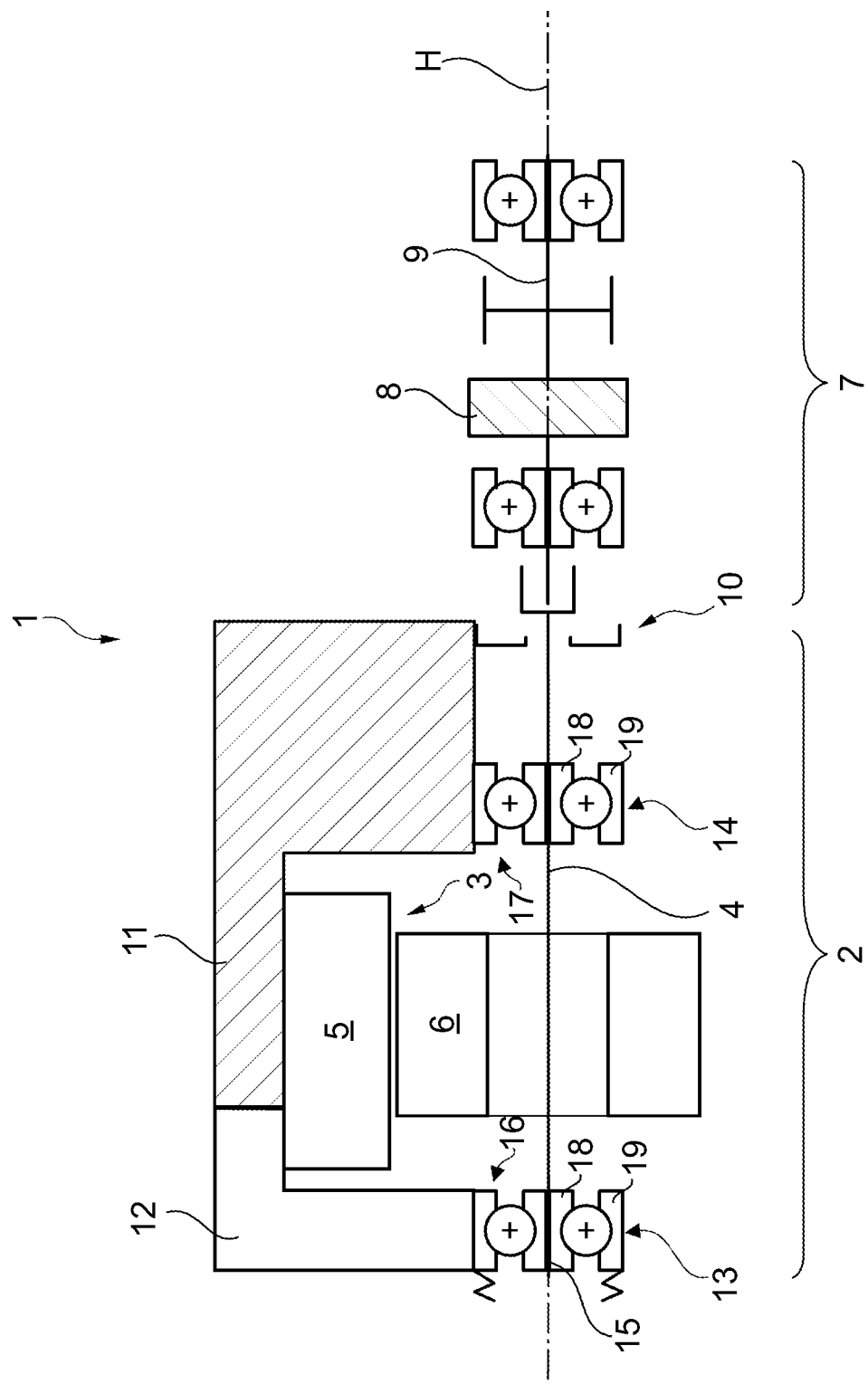
FIG. 1 shows a schematic representation of an electric drive assembly as an exemplary embodiment of the invention.

FIG. 1 shows a schematic representation of an electric drive assembly 1 for a vehicle, not shown, as an exemplary embodiment of the disclosure. For example, the vehicle can be designed as a single or multi-track vehicle and/or as a single or multi-axle vehicle. For example, the vehicle is a purely electric vehicle or a hybrid vehicle. The vehicle can be designed, for example, as a passenger car, bus, or truck.

Alternatively, however, the vehicle can also be designed, for example, as a bicycle (pedelec), a motorcycle with electric drive, or an e-scooter.

The electric drive assembly 1 is used to generate and/or provide a traction torque, e.g., a main traction torque, for the vehicle. For this purpose, the electric drive assembly 1 has an electric drive section 2, which has an electric drive 3 for generating the traction torque and a rotor shaft 4 for transmitting the traction torque. The electric drive 3 can be electrically connected to a power device, such as a battery or accumulator, to provide power to generate traction torque. The electric drive 3 can, for example, be designed as a DC motor, synchronous motor or asynchronous motor.

The electric drive 3 has a stator 5 and a rotor 6. The rotor 6 is connected to the rotor shaft 4 in a non-rotatable manner. The rotor shaft 4 defines a main axis H with its axis of rotation, wherein with respect to the main axis H, the stator 5 and the rotor 6 are arranged to be coaxial and/or concentric with respect to one another. For example, the electric drive 3 is designed as an internal rotor.

Furthermore, the electric drive assembly 1 has a transmission section 7, which is used to transmit and/or translate and/or distribute the traction torque of the electric drive 3. For this purpose, a transmission device 8, indicated only schematically, is arranged in the transmission section 7, wherein the transmission device 8 can include a clutch device, e.g., a form-fitting or friction-locking clutch, and/or a shift device, e.g., an electrically and/or hydraulically actuated shift cylinder, and/or a transmission device, e.g., a planetary and/or stepped gear transmission. The electric drive section 2 and the transmission section 7 are connected to one another in gearing terms via the rotor shaft 4, wherein the rotor shaft 4 forms an input shaft into the transmission device 8. The traction torque can be transmitted to one or more wheels of the vehicle via an output shaft 9, for example.

Furthermore, the electric drive assembly 1 has a separating section 10 which separates a motor compartment of the electric drive section 2 from an adjacent transmission compartment of the transmission section 7. For this purpose, the separating section 10 is arranged in the axial direction with respect to the main axis H between the electric drive section 2 and the transmission section 7. For example, the motor compartment can be a dry region and the adjacent transmission compartment can be another dry region or an oil region, wherein the separating section 10 forms a dirt-tight and optionally an oil-tight separation between the electric drive section 2 and the transmission section 7. The motor compartment can alternatively be designed as a wet compartment, e.g., as a common compartment with the transmission compartment. In particular, the electric drive 3 can be designed as a wet-running electric drive.

The electric drive 3 or electric drive assembly 1 has a housing 11, wherein the stator 5 and the rotor 6 are arranged in the housing 11. Optionally, the transmission device 8 or the transmission section 7 is also arranged in the housing 11. The housing 11 is closed off on a side facing away from the transmission by a housing section 12, so that the housing section 12 delimits a housing interior of the housing 11.

For the rotatable mounting of the rotor shaft 4, the electric drive assembly 1 has a bearing device 13 and a further bearing device 14, wherein the rotor shaft 4 is supported in the radial direction via the bearing devices 13, 14. In the exemplary embodiment shown, the bearing devices 13, 14 are each designed as a ball bearing, in particular as a deep groove ball bearing. Each of the bearing devices 13, 14 has a rotating inner ring 18 and a stationary outer ring 19.

The rotor shaft 4 has a rotor shaft section 15 facing away from the transmission section 7. The rotor shaft section 15 forms an end section of the rotor shaft 4 on the drive side. The bearing device 13 is arranged in the housing section 12. The housing section 12 is closed via the bearing devices 13.

Figure 2:
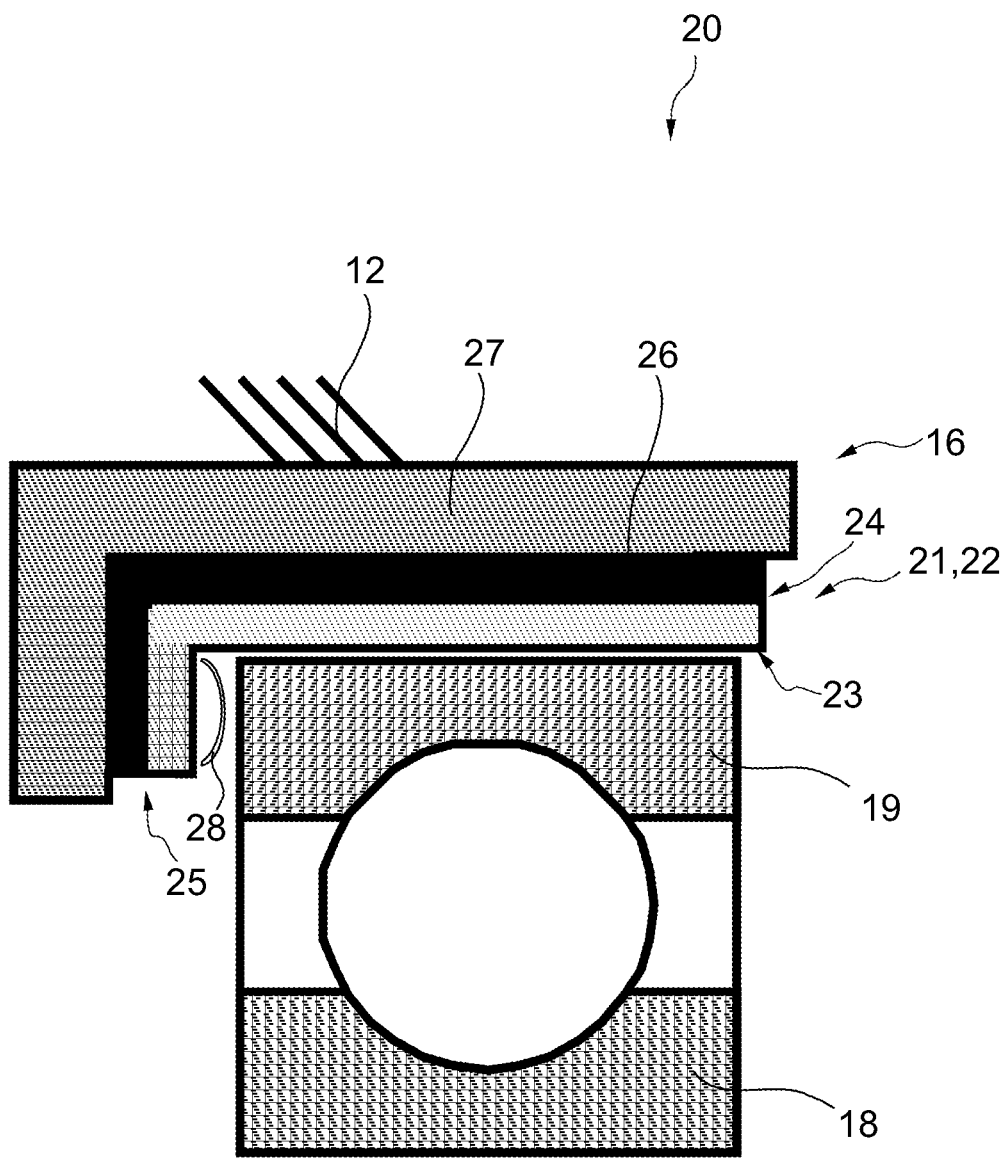
FIG. 2 shows a schematic axial longitudinal section through a bearing assembly of the electric drive assembly.

The housing section 12 has a receiving section 16 shown in FIG. 2, which is designed to receive the bearing device 13. A bushing 27 made of steel or plastic is arranged in the receiving section 16. Alternatively, the receiving section 16 is formed by the bushing 27. The bushing 27 is designed as a cylinder bushing which is closed in regions on the end face. The bushing 27 is fixedly connected to the housing section 12. It can be fastened to the housing section 12 in a materially bonding, force-fitting and/or form-fitting manner.

The bearing device 13 is designed as a floating bearing, which is axially movable in the receiving section 16, in particular in the bushing 27, relative to the main axis H and relative to the housing section 12. The axial movement of the bearing device 13 can compensate for a possible thermal linear expansion of the shaft 4. The further bearing device 14 is received in a further receiving section 17 in the housing 11. It is received in the further receiving section 17 in a non-movable manner.

In a motor operation of the electric drive 3, discharge currents and/or potential differences can be caused, which can discharge via the bearing devices 13, 14 and damage the bearing devices 13, 14. Therefore, the bearing devices 13, 14 are insulated against electrical currents in the housing 11, in the housing section 12 and/or in the shaft 4. The insulation of the bearing devices 13, 14 allows for the electrical currents to be interrupted. By preventing the flow of current through the bearing devices 13, 14, they can be protected from increased wear and failures can be avoided. Thus, expenses for repairing the electric drive assembly 1 and in particular for replacing the bearing devices 13, 14 can be saved.

An insulating device 21 is provided to insulate the bearing device 13, which is designed as a floating bearing. Together with the bearing device 13, it forms a component of a bearing assembly 20 of the electric drive assembly 1.

The bearing assembly 20 is shown in FIG. 2 in an axial sectional view. The bearing assembly 20 is received in the receiving section 16 of the housing section 12, in particular in the bushing 27.

The insulating device 21 is designed as a cylindrical sleeve 22 with a cylinder jacket. The cylinder jacket has an inner peripheral surface 23, an outer peripheral surface 24 and an annular end face 25 that is open centrally in the axial direction. The sleeve 22 is designed as a steel sleeve. It has an electrically insulating coating 26 formed from a plastic material having an electrically insulating property. The coating 26 is applied, e.g., sprayed, on the outer peripheral surface 24 of the sleeve and on an outer side of the end face 25 and covers them completely. In particular, the electrically insulating coating 26 forms the outer peripheral surface 24 of the cylinder jacket and the outer side of the end face 25.

The sleeve 22 is arranged in the bushing 27 in a force-fitting and/or friction-locking manner and thus in a non-rotatable manner. In this arrangement, the electrically insulating coating 26 abuts an inner peripheral surface of the bushing 27 and an inner surface of an end face of the bushing 27.

As a floating bearing, the bearing device 13 is received in the sleeve 22 in an axially movable manner. The outer ring 19 of the bearing device 13, which is formed from steel, can move along the inner peripheral surface 23 of the sleeve 22, which is formed from steel, which results in only slight wear during axial movement. The electrically insulating coating 26 is arranged facing away from the outer ring 19 and is therefore not affected by the axial movement. As a result, a wear of the electrically insulating coating 26 can be avoided and the bearing device 13 can be safely electrically insulated.

The end face 25 of the sleeve 22 forms an end stop for the bearing device 13 when it performs the axial movement. A spring device 28 is arranged between the end face 25 and the outer ring 19 of the bearing device 13 to form an elastic and/or resilient stop.

REFERENCE NUMERALS

1 Electric drive assembly
2 Electric drive section
3 Electric drive
4 Rotor shaft
5 Stator
6 Rotor
7 Transmission section
8 Transmission device
9 Output shaft
10 Separating section
11 Housing
12 Housing section
13 Bearing device
14 Further bearing device
15 Rotor shaft section
16 Receiving section
17 Further receiving section
18 Rotating inner ring
19 Stationary outer ring
20 Bearing assembly
21 Insulating device
22 Sleeve
23 Inner peripheral surface
24 Outer peripheral surface
25 End face
26 Electrically insulating coating
27 Bushing
28 Spring device
H Main axis

The invention claimed is:

1. A bearing assembly to be integrated into an electric drive assembly for a vehicle, the bearing assembly comprising:
a floating bearing,
a sleeve for electrically insulating the floating bearing, the sleeve having:
a sliding interface that slidably receives the floating bearing so as to accommodate axial movement of the floating bearing relative to the sleeve, and
an electrically insulating coating arranged outside of the sliding interface, the electrically insulating coating constructed from an electrically insulating plastic.

2. The bearing assembly according to claim 1, wherein the sleeve has an inner peripheral surface and an outer peripheral surface, and the outer peripheral surface includes the electrically insulating coating.

3. The bearing assembly according to claim 2, wherein the sleeve is formed from steel.

4. The bearing assembly according to claim 1, wherein:
the sleeve is designed as a cylinder,
the cylinder has an end face, and
the electrically insulating coating is arranged on an outer side of the end face.

5. The bearing assembly according to claim 4, wherein the end face forms an end stop for the floating bearing, and a spring device is arranged between the end stop and the floating bearing.

6. An electric drive assembly for a vehicle, comprising:
an electric drive section having:
an electric drive with a rotor,
a shaft: i) connected to the rotor, and ii) having a shaft section, and
a transmission section having a transmission device, and the shaft connected to the transmission device via gearing, and
a housing section, and the shaft section rotatably mounted relative to the housing section, and
a bearing assembly according to claim 1.

7. The electric drive assembly according to claim 6, wherein the shaft section is rotatably mounted relative to the housing section in the floating bearing of the bearing assembly.

8. The electric drive assembly according to claim 6, wherein the housing section has a receiving region for the bearing assembly, wherein the receiving region comprises or is formed by a bushing.

9. The electric drive assembly according to claim 8, wherein the sleeve is non-rotatably received in the receiving region or in the bushing.

10. The bearing assembly of claim 1, wherein the sleeve further comprises:
an inner peripheral surface having the sliding interface, and
an outer peripheral surface: configured to be fixed to a housing section and having the electrically insulating coating.

11. The bearing assembly of claim 10, wherein the electrically insulating coating is not disposed on the sliding interface.

12. A bearing assembly of an electric drive assembly for a vehicle, comprising:
a bushing configured to be insertably fixed to a housing section;
a sleeve disposed within and fixed to the bushing, the sleeve having an electrically insulating coating;
a floating bearing disposed in the sleeve so as to be electrically insulated via the electrically insulating coating of the sleeve; and
a sliding interface of the sleeve slidably receives the floating bearing so as to accommodate axial movement of the floating bearing relative to the sleeve; and
the electrically insulating coating is arranged outside of the sliding interface, the electrically insulating coating constructed from an electrically insulating plastic.

13. The bearing assembly of claim 12, wherein:
the sleeve comprises an inner peripheral surface and an outer peripheral surface; and
the inner peripheral surface defines the sliding interface; and
the outer peripheral surface is formed by the electrically insulating coating.

14. The bearing assembly of claim 12, wherein the sleeve is formed from steel.

15. The bearing assembly of claim 12, wherein:
the sleeve is designed as a cylinder having an end face with an outer side; and
the electrically insulating coating is disposed on the outer side.

16. The bearing assembly of claim 15 further comprising a spring device, wherein:
- the end face forms an end stop for the floating bearing; and
- the spring device is arranged between the end stop and the floating bearing.

17. An electric drive assembly for a vehicle, comprising:
- the bearing assembly of claim 12;
- a housing section;
- a transmission section comprising a transmission device; and
- an electric drive section comprising:
  - an electric drive comprising a rotor; and
  - a shaft connected to the rotor and to the transmission device, the shaft comprising a shaft section rotatably mounted relative to the housing section.

18. The electric drive assembly of claim 17, wherein the shaft section is rotatably mounted relative to the housing section in the floating bearing.

19. A bearing assembly to be integrated into an electric drive assembly for a vehicle, the bearing assembly comprising:
- a sleeve configured to be insertably fixed to a housing section,
- a floating bearing configured to move axially within the sleeve so as to define a sliding interface, and
- electrical insulation axially fixed to the sleeve for electrically insulating the floating bearing, the electrical insulation is disposed on an outer peripheral surface of the sleeve and not disposed on the sliding interface.

20. The bearing assembly of claim 19, wherein the electrical insulation is constructed from an electrically insulating plastic.

* * * * *